United States Patent
Kanuri

(10) Patent No.: US 8,683,126 B2
(45) Date of Patent: Mar. 25, 2014

(54) OPTIMAL USE OF BUFFER SPACE BY A STORAGE CONTROLLER WHICH WRITES RETRIEVED DATA DIRECTLY TO A MEMORY

(75) Inventor: Mrudula Kanuri, Bangalore (IN)

(73) Assignee: Nvidia Corporation, Santa Clara, CA (US)

( * ) Notice: Subject to any disclaimer, the term of this patent is extended or adjusted under 35 U.S.C. 154(b) by 518 days.

(21) Appl. No.: 11/829,983

(22) Filed: Jul. 30, 2007

(65) Prior Publication Data

US 2009/0037689 A1 Feb. 5, 2009

(51) Int. Cl.
*G06F 12/00* (2006.01)

(52) U.S. Cl.
USPC ............... 711/118; 711/147; 710/22; 710/52

(58) Field of Classification Search
USPC ............... 711/118, 147; 710/22, 52
See application file for complete search history.

(56) References Cited

U.S. PATENT DOCUMENTS

| | | |
|---|---|---|
| 3,091,657 A | 5/1963 | Stuessel |
| 3,614,740 A | 10/1971 | Delagi et al. |
| 3,987,291 A | 10/1976 | Gooding et al. |
| 4,101,960 A | 7/1978 | Stokes et al. |
| 4,541,046 A | 9/1985 | Nagashima et al. |
| 4,566,005 A | 1/1986 | Apperley et al. |
| 4,748,585 A | 5/1988 | Chiarulli et al. |
| 4,897,717 A | 1/1990 | Hamilton et al. |
| 4,958,303 A | 9/1990 | Assarpour et al. |
| 4,965,716 A | 10/1990 | Sweeney |
| 4,965,751 A | 10/1990 | Thayer et al. |
| 4,985,848 A | 1/1991 | Pfeiffer et al. |
| 4,991,169 A | 2/1991 | Davis et al. |
| 5,040,109 A | 8/1991 | Bowhill et al. |
| 5,047,975 A | 9/1991 | Patti et al. |
| 5,175,828 A | 12/1992 | Hall et al. |
| 5,179,530 A | 1/1993 | Genusov et al. |
| 5,197,130 A | 3/1993 | Chen et al. |

(Continued)

FOREIGN PATENT DOCUMENTS

| | | |
|---|---|---|
| DE | 29606102 | 6/1996 |
| JP | 0601290 A2 | 1/1994 |

(Continued)

OTHER PUBLICATIONS

Serial Native ATA Command Queuing, An Exciting New Performance Feature for Serial ATA, A Joint Whitepaper BY:Intel Corporation and Seagate Technology, Year Jul. 2003, pp. 1-12.

(Continued)

*Primary Examiner* — Kalpit Parikh

(57) ABSTRACT

A storage controller which uses the same buffer to store data elements retrieved from different secondary storage units. In an embodiment, the controller retrieves location descriptors ahead of when data is available for storing in a target memory. Each location descriptor indicates the memory locations at which data received from a secondary storage is to be stored. Only a subset of the location descriptors may be retrieved and stored ahead when processing each request. Due to such retrieval and storing of limited number of location descriptors, the size of a buffer used by the storage controller may be reduced. Due to retrieval of the location descriptors ahead, unneeded buffering of the data elements within the storage controller is avoided, reducing the latency in writing the data into the main memory, thus improving performance.

22 Claims, 7 Drawing Sheets

(56) References Cited

U.S. PATENT DOCUMENTS

| | | |
|---|---|---|
| 5,210,834 A | 5/1993 | Zurawski et al. |
| 5,263,136 A | 11/1993 | DeAguiar et al. |
| 5,327,369 A | 7/1994 | Ashkenazi |
| 5,357,623 A | 10/1994 | Megory-Cohen |
| 5,375,223 A | 12/1994 | Meyers et al. |
| 5,388,206 A | 2/1995 | Poulton et al. |
| 5,388,245 A | 2/1995 | Wong |
| 5,418,973 A | 5/1995 | Ellis et al. |
| 5,430,841 A | 7/1995 | Tannenbaum et al. |
| 5,430,884 A | 7/1995 | Beard et al. |
| 5,432,905 A | 7/1995 | Hsieh et al. |
| 5,517,666 A | 5/1996 | Ohtani et al. |
| 5,522,080 A | 5/1996 | Harney |
| 5,560,030 A | 9/1996 | Guttag et al. |
| 5,561,808 A | 10/1996 | Kuma et al. |
| 5,574,944 A | 11/1996 | Stager |
| 5,627,988 A | 5/1997 | Oldfield |
| 5,644,753 A | 7/1997 | Ebrahim et al. |
| 5,649,173 A | 7/1997 | Lentz |
| 5,666,169 A | 9/1997 | Ohki et al. |
| 5,682,552 A | 10/1997 | Kuboki et al. |
| 5,682,554 A | 10/1997 | Harrell |
| 5,706,478 A | 1/1998 | Dye |
| 5,751,295 A | 5/1998 | Becklund et al. |
| 5,754,191 A | 5/1998 | Mills et al. |
| 5,761,476 A | 6/1998 | Martell |
| 5,764,243 A | 6/1998 | Baldwin |
| 5,781,799 A * | 7/1998 | Leger et al. ............ 710/22 |
| 5,784,590 A | 7/1998 | Cohen et al. |
| 5,784,640 A | 7/1998 | Asghar et al. |
| 5,796,974 A | 8/1998 | Goddard et al. |
| 5,802,574 A | 9/1998 | Atallah et al. |
| 5,805,905 A | 9/1998 | Biswas et al. |
| 5,809,524 A | 9/1998 | Singh et al. |
| 5,812,147 A | 9/1998 | Van Hook et al. |
| 5,835,788 A | 11/1998 | Blumer et al. |
| 5,848,254 A | 12/1998 | Hagersten |
| 5,864,712 A * | 1/1999 | Carmichael et al. ........ 710/20 |
| 5,894,560 A * | 4/1999 | Carmichael et al. ........ 710/25 |
| 5,920,352 A | 7/1999 | Inoue |
| 5,925,124 A | 7/1999 | Hilgendorf et al. |
| 5,940,090 A | 8/1999 | Wilde |
| 5,940,858 A | 8/1999 | Green |
| 5,949,410 A | 9/1999 | Fung |
| 5,950,012 A | 9/1999 | Shiell et al. |
| 5,978,838 A | 11/1999 | Mohamed et al. |
| 5,999,199 A | 12/1999 | Larson |
| 6,009,454 A | 12/1999 | Dummermuth |
| 6,016,474 A | 1/2000 | Kim et al. |
| 6,041,399 A | 3/2000 | Terada et al. |
| 6,044,419 A | 3/2000 | Hayek et al. |
| 6,049,672 A | 4/2000 | Shiell et al. |
| 6,073,158 A | 6/2000 | Nally et al. |
| 6,092,094 A | 7/2000 | Ireton |
| 6,108,766 A | 8/2000 | Hahn et al. |
| 6,112,019 A | 8/2000 | Chamdani et al. |
| 6,131,152 A | 10/2000 | Ang et al. |
| 6,138,189 A | 10/2000 | Kalkunte |
| 6,141,740 A | 10/2000 | Mahalingaiah et al. |
| 6,144,392 A | 11/2000 | Rogers |
| 6,150,610 A | 11/2000 | Sutton |
| 6,173,381 B1 | 1/2001 | Dye |
| 6,189,068 B1 | 2/2001 | Witt et al. |
| 6,192,073 B1 | 2/2001 | Reader et al. |
| 6,192,458 B1 | 2/2001 | Arimilli et al. |
| 6,208,361 B1 | 3/2001 | Gossett |
| 6,209,078 B1 | 3/2001 | Chiang et al. |
| 6,222,552 B1 | 4/2001 | Haas et al. |
| 6,230,254 B1 | 5/2001 | Senter et al. |
| 6,239,810 B1 | 5/2001 | Van Hook et al. |
| 6,247,094 B1 | 6/2001 | Kumar et al. |
| 6,252,610 B1 | 6/2001 | Hussain |
| 6,292,886 B1 | 9/2001 | Makineni et al. |
| 6,301,600 B1 | 10/2001 | Petro et al. |
| 6,314,493 B1 | 11/2001 | Luick |
| 6,317,819 B1 | 11/2001 | Morton |
| 6,351,808 B1 | 2/2002 | Joy et al. |
| 6,370,617 B1 | 4/2002 | Lu et al. |
| 6,437,789 B1 | 8/2002 | Tidwell et al. |
| 6,438,664 B1 | 8/2002 | McGrath et al. |
| 6,480,927 B1 | 11/2002 | Bauman |
| 6,490,654 B2 | 12/2002 | Wickeraad et al. |
| 6,496,902 B1 | 12/2002 | Faanes et al. |
| 6,499,090 B1 | 12/2002 | Hill et al. |
| 6,525,737 B1 | 2/2003 | Duluk, Jr. et al. |
| 6,529,201 B1 | 3/2003 | Ault et al. |
| 6,597,357 B1 | 7/2003 | Thomas |
| 6,603,481 B1 | 8/2003 | Kawai et al. |
| 6,624,818 B1 | 9/2003 | Mantor et al. |
| 6,629,188 B1 | 9/2003 | Minkin et al. |
| 6,631,423 B1 | 10/2003 | Brown et al. |
| 6,631,463 B1 | 10/2003 | Floyd et al. |
| 6,657,635 B1 | 12/2003 | Hutchins et al. |
| 6,658,447 B2 | 12/2003 | Cota-Robles |
| 6,674,841 B1 | 1/2004 | Johns et al. |
| 6,700,588 B1 | 3/2004 | MacInnis et al. |
| 6,704,847 B1 * | 3/2004 | Six et al. .............. 711/151 |
| 6,715,035 B1 | 3/2004 | Colglazier et al. |
| 6,732,242 B2 | 5/2004 | Hill et al. |
| 6,742,064 B2 * | 5/2004 | Waldie et al. ........... 710/124 |
| 6,809,732 B2 | 10/2004 | Zatz et al. |
| 6,812,929 B2 | 11/2004 | Lavelle et al. |
| 6,825,843 B2 | 11/2004 | Allen et al. |
| 6,825,848 B1 | 11/2004 | Fu et al. |
| 6,839,062 B2 | 1/2005 | Aronson et al. |
| 6,862,027 B2 | 3/2005 | Andrews et al. |
| 6,891,543 B2 | 5/2005 | Wyatt |
| 6,915,385 B1 | 7/2005 | Leasure et al. |
| 6,944,744 B2 | 9/2005 | Ahmed et al. |
| 6,952,214 B2 | 10/2005 | Naegle et al. |
| 6,965,982 B2 | 11/2005 | Nemawarkar |
| 6,975,324 B1 | 12/2005 | Valmiki et al. |
| 6,976,126 B2 | 12/2005 | Clegg et al. |
| 6,978,149 B1 | 12/2005 | Morelli et al. |
| 6,978,457 B1 | 12/2005 | Johl et al. |
| 6,981,106 B1 | 12/2005 | Bauman et al. |
| 6,985,151 B1 | 1/2006 | Bastos et al. |
| 7,015,909 B1 | 3/2006 | Morgan III et al. |
| 7,031,330 B1 | 4/2006 | Bianchini, Jr. |
| 7,032,097 B2 | 4/2006 | Alexander et al. |
| 7,035,979 B2 | 4/2006 | Azevedo et al. |
| 7,043,667 B2 * | 5/2006 | Smith .............. 714/43 |
| 7,080,169 B2 * | 7/2006 | Tang et al. ............. 710/52 |
| 7,148,888 B2 | 12/2006 | Huang |
| 7,151,544 B2 | 12/2006 | Emberling |
| 7,154,500 B2 | 12/2006 | Heng et al. |
| 7,159,212 B2 | 1/2007 | Schenk et al. |
| 7,185,178 B1 | 2/2007 | Barreh et al. |
| 7,202,872 B2 | 4/2007 | Paltashev et al. |
| 7,260,677 B1 | 8/2007 | Vartti et al. |
| 7,305,540 B1 | 12/2007 | Trivedi et al. |
| 7,321,787 B2 | 1/2008 | Kim |
| 7,334,110 B1 | 2/2008 | Faanes et al. |
| 7,369,815 B2 | 5/2008 | Kang et al. |
| 7,373,478 B2 | 5/2008 | Yamazaki |
| 7,406,698 B2 | 7/2008 | Richardson |
| 7,412,570 B2 | 8/2008 | Moll et al. |
| 7,486,290 B1 | 2/2009 | Kilgariff et al. |
| 7,487,305 B2 | 2/2009 | Hill et al. |
| 7,493,452 B2 | 2/2009 | Eichenberger et al. |
| 7,545,381 B2 | 6/2009 | Huang et al. |
| 7,564,460 B2 | 7/2009 | Boland et al. |
| 7,620,749 B2 * | 11/2009 | Biran et al. .......... 710/22 |
| 7,650,459 B2 * | 1/2010 | Eilert et al. ............ 711/103 |
| 7,750,913 B1 | 7/2010 | Parenteau et al. |
| 7,777,748 B2 | 8/2010 | Bakalash et al. |
| 7,852,341 B1 | 12/2010 | Rouet et al. |
| 7,869,835 B1 | 1/2011 | Zu |
| 8,020,169 B2 | 9/2011 | Yamasaki |
| 2001/0026647 A1 | 10/2001 | Morita |
| 2002/0116595 A1 | 8/2002 | Morton |
| 2002/0130874 A1 | 9/2002 | Baldwin |
| 2002/0144061 A1 | 10/2002 | Faanes et al. |
| 2002/0194430 A1 | 12/2002 | Cho |

(56) References Cited

U.S. PATENT DOCUMENTS

| | | | |
|---|---|---|---|
| 2003/0001847 | A1 | 1/2003 | Doyle et al. |
| 2003/0003943 | A1 | 1/2003 | Bajikar |
| 2003/0014457 | A1 | 1/2003 | Desai et al. |
| 2003/0016217 | A1 | 1/2003 | Vlachos et al. |
| 2003/0016844 | A1 | 1/2003 | Numaoka |
| 2003/0031258 | A1 | 2/2003 | Wang et al. |
| 2003/0172326 | A1 | 9/2003 | Coffin, III et al. |
| 2003/0188118 | A1 | 10/2003 | Jackson |
| 2003/0204673 | A1 | 10/2003 | Venkumahanti et al. |
| 2003/0204680 | A1 | 10/2003 | Hardage, Jr. |
| 2003/0227461 | A1 | 12/2003 | Hux et al. |
| 2004/0012597 | A1 | 1/2004 | Zatz et al. |
| 2004/0073771 | A1 | 4/2004 | Chen et al. |
| 2004/0073773 | A1 | 4/2004 | Demjanenko |
| 2004/0103253 | A1 | 5/2004 | Kamei et al. |
| 2004/0193837 | A1 | 9/2004 | Devaney et al. |
| 2004/0205326 | A1 | 10/2004 | Sindagi et al. |
| 2004/0212730 | A1 | 10/2004 | MacInnis et al. |
| 2004/0215887 | A1 | 10/2004 | Starke |
| 2004/0221117 | A1 | 11/2004 | Shelor |
| 2004/0263519 | A1 | 12/2004 | Andrews et al. |
| 2005/0012759 | A1 | 1/2005 | Valmiki et al. |
| 2005/0024369 | A1 | 2/2005 | Xie |
| 2005/0071722 | A1 | 3/2005 | Biles |
| 2005/0088448 | A1 | 4/2005 | Hussain et al. |
| 2005/0239518 | A1 | 10/2005 | D'Agostino et al. |
| 2005/0262332 | A1 | 11/2005 | Rappoport et al. |
| 2005/0280652 | A1 | 12/2005 | Hutchins et al. |
| 2006/0020843 | A1 | 1/2006 | Frodsham et al. |
| 2006/0064517 | A1 | 3/2006 | Oliver |
| 2006/0064547 | A1 | 3/2006 | Kottapalli et al. |
| 2006/0067473 | A1 | 3/2006 | Eberhard et al. |
| 2006/0103659 | A1 | 5/2006 | Karandikar et al. |
| 2006/0152519 | A1 | 7/2006 | Hutchins et al. |
| 2006/0152520 | A1 | 7/2006 | Gadre et al. |
| 2006/0176308 | A1 | 8/2006 | Karandikar et al. |
| 2006/0176309 | A1 | 8/2006 | Gadre et al. |
| 2007/0076010 | A1 | 4/2007 | Swamy et al. |
| 2007/0130444 | A1 | 6/2007 | Mitu et al. |
| 2007/0162645 | A1 | 7/2007 | Han et al. |
| 2007/0285427 | A1 | 12/2007 | Morein et al. |
| 2008/0016327 | A1 | 1/2008 | Menon et al. |
| 2008/0278509 | A1 | 11/2008 | Washizu et al. |
| 2009/0172257 | A1* | 7/2009 | Prins et al. .................. 711/103 |
| 2009/0235051 | A1 | 9/2009 | Codrescu et al. |
| 2012/0023149 | A1 | 1/2012 | Kinsman et al. |

FOREIGN PATENT DOCUMENTS

| | | |
|---|---|---|
| JP | 07101885 | 4/1995 |
| JP | H08077347 | 3/1996 |
| JP | H08153032 | 6/1996 |
| JP | 08297605 | 12/1996 |
| JP | 09287217 | 11/1997 |
| JP | H09325759 | 12/1997 |
| JP | 10222476 | 8/1998 |
| JP | 10293656 A2 | 11/1998 |
| JP | 11003183 A2 | 1/1999 |
| JP | 11190447 | 7/1999 |
| JP | 11355717 A2 | 12/1999 |
| JP | 2000148695 | 5/2000 |
| JP | 2001022638 | 1/2001 |
| JP | 2003178294 | 6/2003 |
| JP | 2004252990 | 9/2004 |
| KR | 100262453 | 8/2000 |
| KR | 1998018215 | 8/2000 |
| KR | 1020050076274 | 7/2005 |
| WO | 03034230 | 4/2003 |

OTHER PUBLICATIONS

"Alpha Testing State"; http://msdn.microsoft.com/library/en-us/directx9_c/directx/graphics/programmingguide/GettingStarted/Direct3Kdevices/States/renderstates/alphatestingstate.asp Mar. 25, 2005.

"Anti-aliasing"; http://en.wikipedia.org/wiki/Anti-aliasing; Mar. 27, 2006.

"Vertex Fog"; http://msdn.microsoft.com/library/en-us/directx9_c/Vertex_fog.asp?frame=true Mar. 27, 2006.

Brown, Brian; "Data Structure and Number Systems"; 2000; http://www.ibilce.unesp.br/courseware/datas/data3.htm.

Definition of "block" from FOLDOC, http://foldoc.org/index.cgi?block, Sep. 23, 2004.

Definition of "first-in first-out" from FOLDOC, http://foldoc.org/index.cgi?query=fifo&action=Search, Dec. 6, 1999.

Definition of "queue" from Free on-Line Dictionary of Computing (FOLDOC), http://foldoc.org/index.cgi?query=queue&action=Search, May 15, 2007.

Definition of "Slot," http://www.thefreedictionary.com/slot, Oct. 2, 2012.

Duca et al., A Relational Debugging Engine for Graphics Pipeline, International Conference on Computer Graphics and Interactive Techniques, ACM SIGGRAPH 2005, pp. 453-463, ISSN: 0730-0301.

Fisher, Joseph A., Very Long Instruction Word Architecture and the ELI-512, ACM, 1993, pp. 140-150.

FOLDOC (Free On-Line Dictionary of Computing), definition of X86, Feb. 27, 2004.

FOLDOC, definition of "frame buffer", from foldoc.org/index.cgi?query=frame+buffer&action=Search, Oct. 3, 1997.

FOLDOC, definition of "motherboard", from foldoc.org/index.cgi?query=motherboard&action=Search, Aug. 10, 2000.

FOLDOC, definition of "separate compilation", from foldoc.org/index.cgi?query=separate+compilation&action=Search, Feb. 19, 2005.

FOLDOC, definition of "superscalar", http://foldoc.org/, Jun. 22, 2009.

FOLDOC, definition of "vector processor", http://foldoc.org/, Sep. 11, 2003.

FOLDOC, definition of Pentium, Sep. 30, 2003.

FOLDOC, Free Online Dictionary of Computing, definition of SIMD, foldoc.org/index.cgi?query=simd&action=Search, Nov. 4, 1994.

Free On-Line Dictionary of Computing (FOLDOC), definition of "video", from foldoc.org/index.cgi? query=video&action=Search, May 23, 2008.

Gadre, S., Patent Application Entitled "Separately Schedulable Condition Codes for a Video Processor", U.S. Appl. No. 11/267,793, filed Nov. 4, 2005.

gDEBugger, graphicRemedy, http://www.gremedy.com, Aug. 8, 2006.

Graf, Rudolf F., Modern Dictionary of Electronics, Howard W. Sams & Company, 1984, pp. 566.

Graf, Rudolf F., Modern Dictionary of Electronics, Howard W. Sams & Company, 1988, pp. 273.

Graham, Susan L. et al., Getting Up to Speed: The future of Supercomputing, the National Academies Press, 2005, glossary.

Graston et al. (Software Pipelining Irregular Loops on the TMS320C6000 VLIW DSP Architecture); Proceedings of the ACM SIGPLAN workshop on Languages, compilers and tools for embedded systems; pp. 138-144; Year of Publication: 2001.

Hamacher, V. Carl et 1., Computer Organization, Second Edition, McGraw Hill, 1984, pp. 1-9.

Heirich; Optimal Automatic Multi-pass Shader Partitioning by Dynamic Programming; Eurographics-Graphics Hardware (2005); Jul. 2005.

HPL-PD A Parameterized Research Approach—May 31, 2004 http://web.archive.org/web/*/www.trimaran.org/docs/5_hpl-pd.pdf.

Hutchins E., SC10: A Video Processor and Pixel-Shading GPU for Handheld Devices; presented at the Hot Chips conferences on Aug. 23rd, 2004.

IBM TDB, Device Queue Management, vol. 31 Iss. 10, pp. 45-50, Mar. 1, 1989.

Intel, Intel Architecture Software Developer's Manual, vol. 1: Basic Architecture 1997 p. 8-1.

Intel, Intel Architecture Software Developer's Manual, vol. 1: Basic Architecture 1999 p. 8-1, 9-1.

Intel, Intel MMX Technology at a Glance, Jun. 1997.

(56) References Cited

OTHER PUBLICATIONS

Intel, Intel Pentium III Xeon Processor at 500 and 550 Mhz, Feb. 1999.
Intel, Pentium Processor Family Developer's Manual, 1997, pp. 2-13.
Intel, Pentium processor with MMX Technology at 233Mhz Performance Brief, Jan. 1998, pp. 3 and 8.
Karandikar et al., Patent Application Entitled: "A Pipelined L2 Cache for Memory Transfers for a Video Processor", U.S. Appl. No. 11/267,606, filed Nov. 4, 2005.
Karandikar, et al., Patent Application Entitled "Context Switching on a Video Processor Having a Scalar Execution Unit and a Vector Execution Unit", U.S. Appl. No. 11/267,778, filed Nov. 4, 2005.
Karandikar, et al., Patent Application Entitled: "Command Acceleration in a Video Processor", U.S. Appl. No. 11/267,640, filed Nov. 4, 2005.
Karandikar, et at., Patent Application Entitled "A Configurable SIMD Engine in a Video Processor", U.S. Appl. No. 11/267,393, filed Nov. 4, 2005.
Kozyrakis, "A Media enhanced vector architecture for embedded memory systems," Jul. 1999, http://digitalassets.lib.berkeley.edu/techreports/ucb/text/CSD-99/1059.pdf.
Lew, et al., Patent Application Entitled "A Programmable DMA Engine for Implementing Memory Transfers for a Video Processor", U.S. Appl. No. 11/267,777, filed Nov. 4, 2005.
Lew, et al., Patent Application Entitled "Multi Context Execution on a Video Processor", U.S. Appl. No. 11/267,780, filed Nov. 4, 2005.
Merriam-Webster Dictionary Online; Definition for "program"; retrieved Dec. 14, 2010.
Espasa R et al: "Decoupled vector architectures", High-Performance Computer Architecture, 1996. Proceedings., Second International Symposium on San Jose, CA, USA Feb. 3-7, 1996, Los Alamitos, CA, USA, IEEE Comput. Soc, US, Feb. 3, 1996, pp. 281-290, XP01 0162067, DOI: 10.11 09/HPCA.1996.501193 ISBN: 978-0-8186-7237-8.
Espasa et al., "Decoupled Vector Architectures", Departament d'Arquitectura de Computadors, Universitat Politecnica de Catalunya, 0-8186-7287-4/96, IEEE 1996, pp. 281-290.

\* cited by examiner

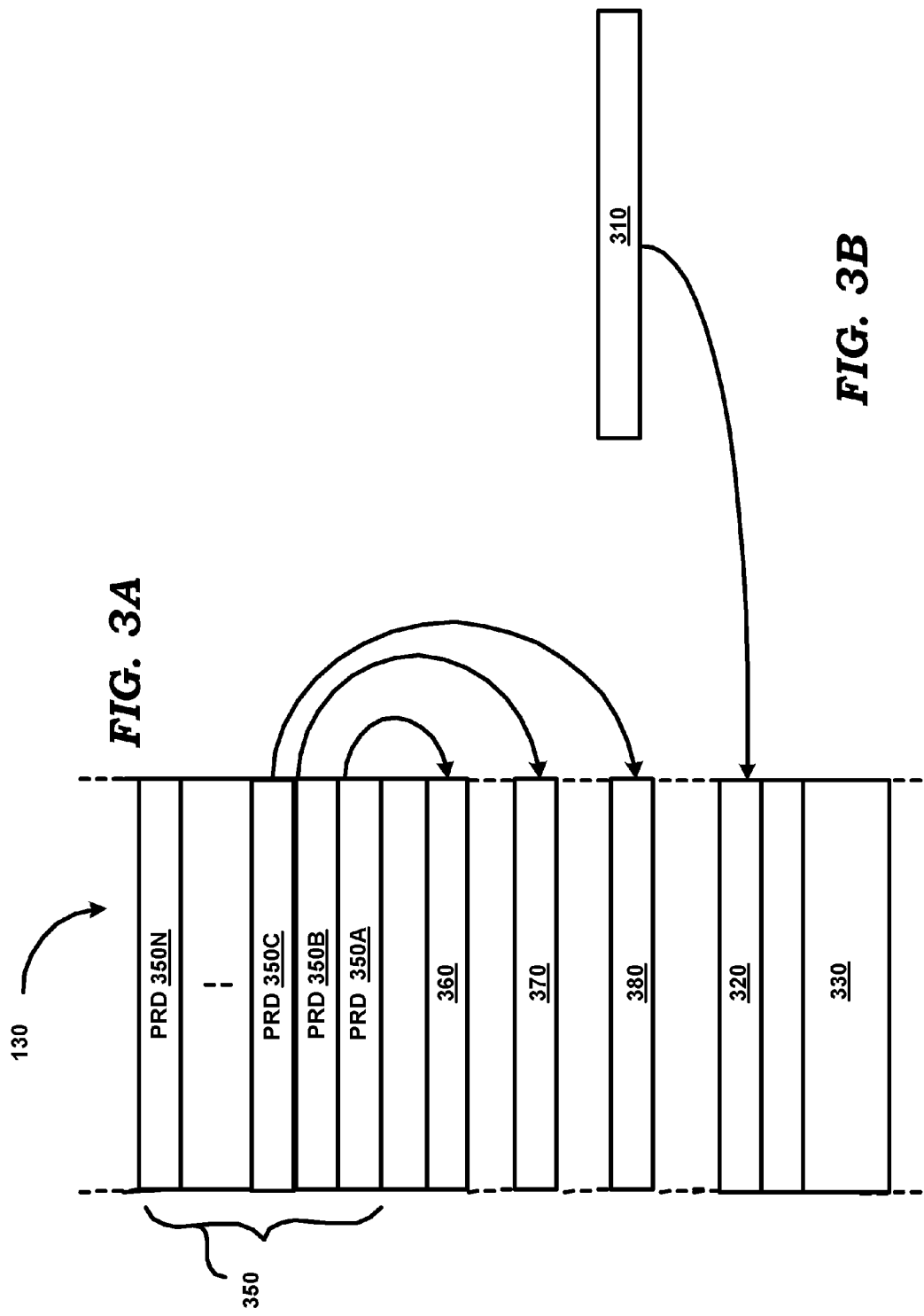

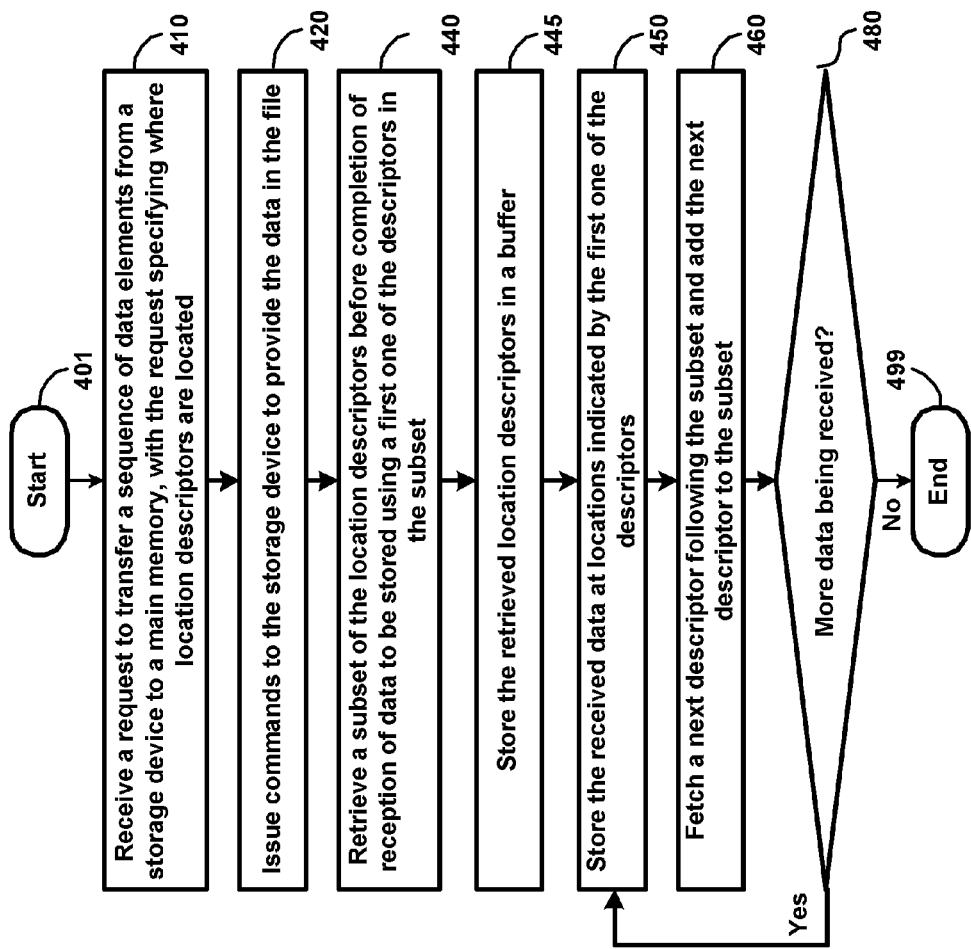

OPTIMAL USE OF BUFFER SPACE BY A STORAGE CONTROLLER WHICH WRITES RETRIEVED DATA DIRECTLY TO A MEMORY

BACKGROUND

1. Field of Disclosure

The present disclosure relates generally to storage technology, and more specifically to optimal use of buffer space by a storage controller which writes retrieved data directly to a memory.

2. Related Art

A storage controller refers to a component (or unit), which controls read and write requests to a non-volatile storage medium. The requests are often received from central processors (e.g., a central processing unit, CPU) and the storage controller interfaces with the non-volatile storage medium to process each request. In case of read requests, the storage controller retrieves data from the non-volatile storage medium.

Storage controllers are often required to write retrieved data into a memory. For example, a CPU may indicate that the data contained in a file be retrieved and stored in random access memory (RAM) operating as a main memory (to distinguish from the controller memory, noted below).

The storage controller may further be requested to write directly into the memory. 'Directly' generally implies that the storage controller store the data in the RAM, without interrupting the CPU for each storage operation. As an illustration, in a direct memory access (DMA) operation, a storage controller interrupts a CPU only after completion of storing the entire data.

Buffer space is typically provided in (or associated with) storage controllers to support various read/write requests. Buffer space provides for temporary storage and allows orderly transfer of data even in case of speed mismatches and unavailability of resources (e.g., a bus) to store the data in the target main memory. The buffer space is typically implemented as a RAM, and referred to as a controller memory.

It is generally desirable that the buffer space be used optimally such that various operations can be supported efficiently (one or more of better throughput, reduced latency, etc.), even with smaller buffer/memory sizes.

BRIEF DESCRIPTION OF THE DRAWINGS

Example embodiments will be described with reference to the following accompanying drawings, which are described briefly below.

FIGS. 3A and 3B are diagrams showing the manner in which location descriptors are specified by a processor requesting data, in one embodiment.

FIG. 4 is a flowchart illustrating the manner in which the size of a buffer used by a storage controller may be reduced in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
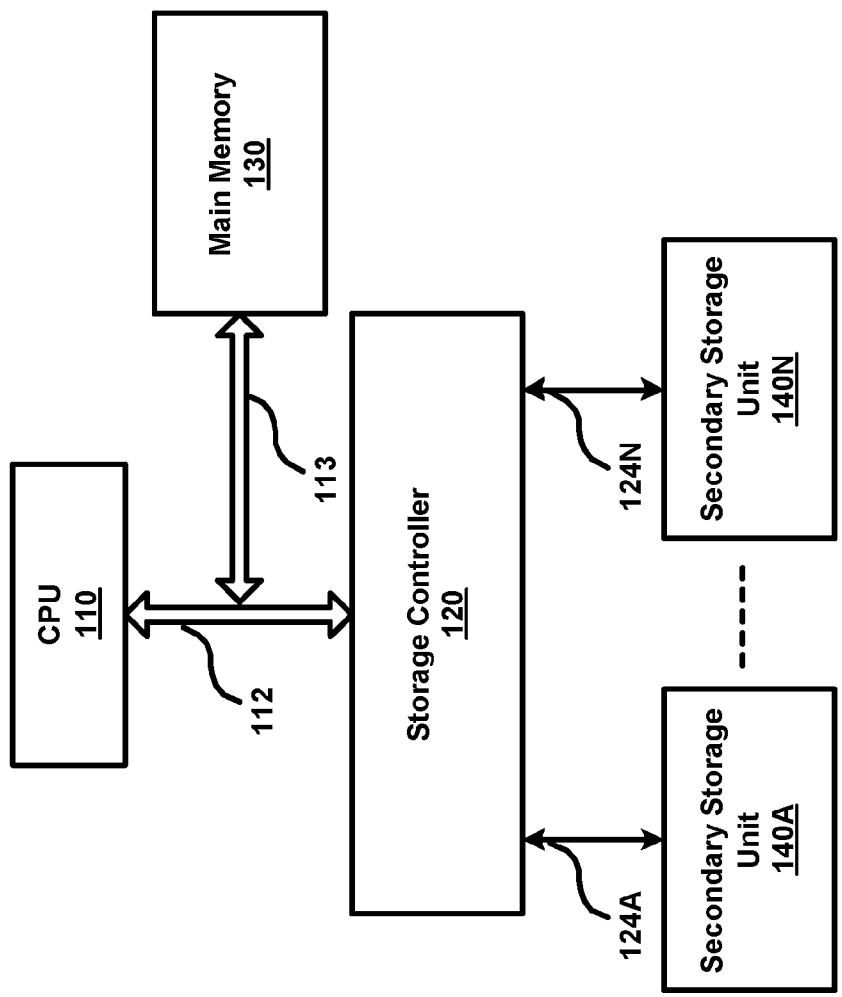
FIG. 1 is a diagram illustrating an example system in which several features of the present invention may be implemented.

A storage controller provided according to an aspect of the present invention uses a single buffer to store the data retrieved from multiple secondary storage units. In an embodiment, a control unit provided in the storage controller is designed with the flexibility of storing the data elements retrieved from any of the secondary storage units in each of a set of (one or more) memory locations in the buffer. The buffer space may be used optimally and the buffer size requirements may be reduced as a result.

An aspect of the present invention provides for further optimal usage by pre-fetching location descriptors (which indicate the locations of a target memory where the retrieved data elements are to be eventually stored in the target memory) before the corresponding information may be required. In an embodiment, the storage controller issues commands to a non-volatile memory to provide the data elements requested in a read request, and retrieves only a subset of location descriptors. The number of elements in the subset is chosen to ensure availability of the location descriptors soon after the corresponding data elements are available for storing. The retrieved location descriptors may also be stored in a buffer.

Due to the retrieval and storing of only a subset of the location descriptors, the buffer size requirements may be reduced. Such a requirement may be of importance when the technology (e.g., NCQ) permits secondary storage units to send data elements related to later requests before sending the data elements related to earlier requests, and it is desirable that the storage controller retrieve location descriptors for all the pending requests.

Due to the retrieval of location descriptors in advance, the time duration for which the data is buffered in the storage controller may be reduced, thereby reducing the buffer size requirements further in addition to completing data transfers with lower latency without being hampered by immediate unavailability of storage descriptors. Such timely availability of location descriptors may be of importance when a single buffer is used for storing the data retrieved from different secondary storage units since the shared buffer may be designed to be of smaller size and freeing the locations for storing data related to other requests may be necessary.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention. Further more the features/aspects described can be practiced in various combinations, though only some of the combinations are described herein for conciseness.

2. Example System

FIG. 1 is a diagram illustrating an example system in which several features of the present invention may be implemented. The diagram is shown containing central processing unit (CPU 110), storage controller 120, main memory 130, and secondary storage units 140A-140N. It must be understood that a typical environment may contain various other components (both in type and number), which are not shown as not being relevant to an understanding of the described features. Similarly, some other systems may contain fewer components. Each component of FIG. 1 is described in detail below.

Main memory 130 may be implemented as a random-access memory (RAM, e.g. dynamic RAM-DRAM) and stores various instructions and data. Some of the instructions (e.g., representing user applications) executed by CPU 110 cause data to be retrieved from the secondary storage units according to several aspects of the present invention. Some other instructions representing an operating system, may allocate the specific locations in main memory 130 to store the retrieved data. Execution of some other instructions cause other features described below to be provided. Similarly, main memory 130 may store location descriptors (described in sections below) as well as to store the retrieved data elements, as described in sections below.

Each of secondary storage units 140A-140N contains a non-volatile storage medium, and may be implemented, for example, as hard disks, CD-ROM, etc. Secondary storage units 140A-140N generally contain controller units within them to co-ordinate various operations involving data (such as reading, writing, data transfer to storage controller 120), and may be implemented consistent with the corresponding protocols/standards such as SATA (Serial Advanced Technology Attachment) well known in the relevant arts.

In case of serial technologies, a request for a sequence of bytes may be sent on path 124A and the requested bytes (data elements) may be received in sequence for the request. In one embodiment, only one request can be pending to each secondary storage. However, in case support exists for multiple requests to be pending to each secondary storage, (e.g., using NCQ, native command queuing), data related to multiple requests may be re-ordered (during reception), but the data related to each request may continue to be received in the same order as in which the data is (logically) stored in the secondary storage.

CPU 110 may represent one or more processor units, which execute software instructions (e.g., retrieved from main memory 130). Some of the instructions may issue requests to retrieve data from the secondary storage units. In an embodiment, CPU 110 merely issues a request to transfer a sequence of data elements, and storage controller 120 generates an interrupt to signal the completion of transfer of the requested data. It should be understood that several requests may be issued within a short duration such that many of the requests are being processed by storage controller 120. The requests being processed may be referred to as pending requests.

Storage controller 120 receives requests from CPU 110 (via path 112) to read a sequence of data elements from secondary storage units 140A-140N, and issues corresponding commands to secondary storage units 140A-140N to provide the requested data elements. Once the data is retrieved from the secondary storage units, storage controller 120 transfers the data to the respective target memories specified by the requests received from the CPU.

In between reception of the data from a secondary storage unit and transfer thereafter to memory 130, storage controller 120 needs to store the data temporarily.

In one prior embodiment, storage controller 120 contains one buffer each for data received on each of the physical interfaces (links) 124A-124N. Such an approach leads to higher aggregate on-chip memory (in all the buffers together), which may be undesirable due to reasons such as enhanced cost and die area requirements.

A storage controller provided according to an aspect of the present invention overcomes some of such disadvantages, as described below in further detail.

3. Storage Controller

Figure 2:
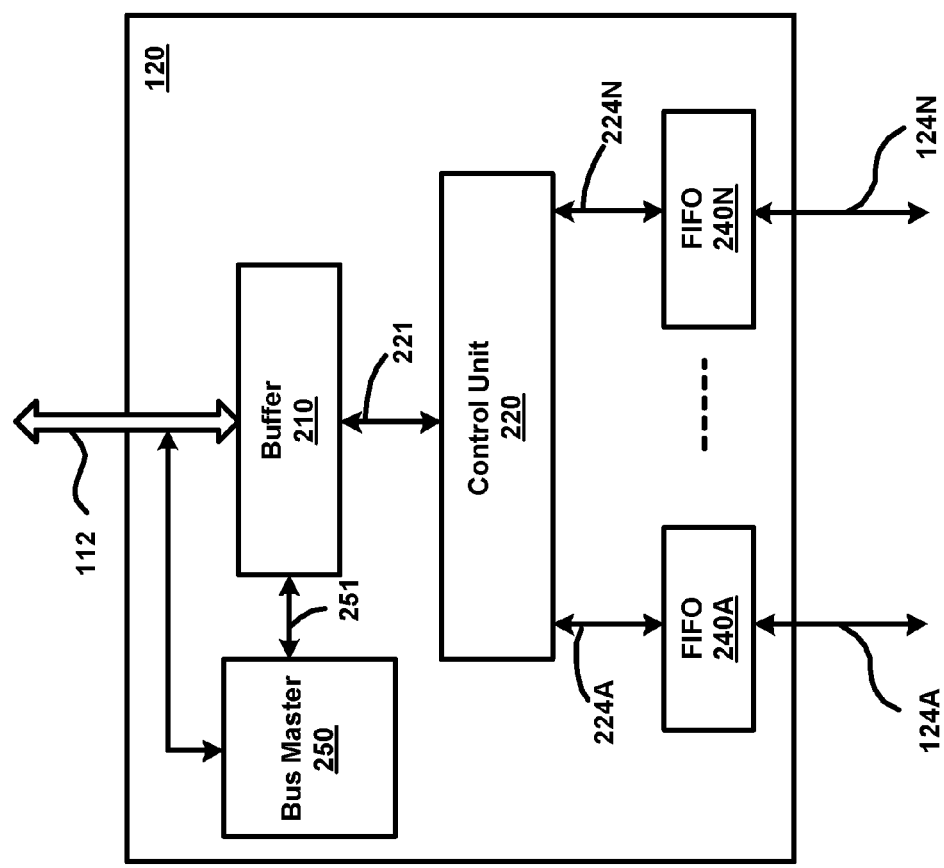
FIG. 2 is a block diagram illustrating the details of a storage controller in an embodiment.

FIG. 2 is a block diagram illustrating the details of a storage controller in an embodiment of the present invention. Storage controller 120 is shown containing buffer 210, control unit 220, FIFOs 240A-240N and bus master 250. Storage controller 120 may contain various other components/blocks not shown in the figure as not being relevant to the following description. The description is provided assuming that read requests are received indicating that data elements are to be retrieved from secondary storage unit 140A, and the retrieved data elements are to be stored in main memory 130. However, different storage units and target memories can be specified without departing from the scope and spirit of various aspects of the present invention. Each component of FIG. 2 is described in detail below.

Each of FIFOs 240A-240N provides temporary storage for data received via paths 124A-124N from a corresponding secondary storage unit 140A-140N before control unit 220 moves the data (from the corresponding FIFO via paths 224A-224N) to buffer 210. In addition, each FIFO may store any status/control information received from the secondary storage unit and provide the same to control unit 220. In an embodiment implemented in the context of SATA protocol, well known in the relevant arts, each FIFO is used for flow control purposes purpose in order to meet the protocol specification. For example, SATA requires the storage controller to be able to receive at least the 21 Dwords after receive flow control is initiated by it on path 124A. This ensures that the data on any port is never dropped due to possible arbitration latency in acquiring the shared buffer 210.

Control unit 220 performs various operations to co-ordinate data transfer between paths 112 and 124A/124N. In particular, control unit 220 may receive requests on path 112 to retrieve a sequence of bytes stored on a storage unit connected on any of paths 124A-124N. The sequence of bytes may be specified according to any pre-specified convention (e.g., according to Advanced Host Controller Interface (AHCI) standard, well known in the relevant arts) and are generally provided by device driver software executed by CPU 110. The requests also specify a target memory and the location(s) in the target memory where the data is to be stored, for example, as described in sections below.

Control unit 220 issues corresponding commands (e.g., according to the SATA standard) on paths 124A-124N to a storage unit to retrieve the requested data into the corresponding FIFO. Control unit 220 then transfers the data in each FIFO to buffer 210. Control unit 220 may store control information along with the data to facilitate the data to be stored in the target memory/locations as described in sections below with examples.

Buffer 210 represents a randomly accessible memory in which the data received from paths 124A-124N is stored temporarily before storing in main memory 130. In an embodiment, a single memory unit (having a matrix of memory cells and an access circuitry) implemented as a SRAM is used for storing the data received on all paths 124A-124N. The SRAM is implemented along with the other components of storage controller as a single integrated circuit and buffer 210 is thus said to be "on-chip" in such a scenario. However, alternative embodiments may use multiple memory units supporting a single buffer.

According to an aspect of the present invention, the memory space is shared such that at least some of the memory locations can be used to store data retrieved on any of the paths 124A-124N. The buffer space may be utilized efficiently due to such sharing. Due to the efficient use of buffer space, such sharing may be rendered possible while avoiding performance bottlenecks and data drop (overflow).

Bus master 250 transfers the data in buffer 210 to main memory 130. In an embodiment, bus master 250 arbitrates for access to bus 112 and then uses DMA techniques to store the data of buffer 210 in memory 130. When the last data element is stored, bus master 250 may first send an interrupt to CPU 110 (indicating that the data transfer is complete) and relinquish control of bus 112.

In an embodiment, the data retrieved from secondary storage units is stored in target memory/locations as specified by location descriptors associated with a command received from CPU 110 and accordingly the description is continued with respect to location descriptors.

4. Location Descriptors

FIGS. 3A and 3B respectively represent a portion of a main memory and a register in control unit 220, and are used in conjunction with FIGS. 1 and 2 to illustrate the manner in which information on location descriptors is provided by CPU 110 to control unit 220 in an embodiment. As noted above, each location descriptor indicates a target memory and the locations therein, at which a corresponding block of data elements are to be written.

In an embodiment, CPU 110 writes a command to register 310 in control unit 220. In the AHCI standard, the location descriptors are each referred to as a physical region descriptor (PRD) and thus memory 130 is shown with PRD table 350. Each entry in PRD table 350 contains a location information specifying where (i.e., the individual memory location addresses) in main memory 130 a corresponding portion of the data in the file (sequence of data elements forming the file content) to be read is to be stored. The target memory can be more than one memory unit, in which case the location descriptors may specify the specific one of the memory units as well (according to a specified convention). In the example of FIG. 3A, PRDs 350A, 350B, and 350C correspond to main memory locations 360, 370, and 380, respectively.

PRDs 350A-350N may be located at contiguous locations within PRD table 350. Alternatively, PRD table itself may be implemented as a linked list, with each PRD (except the last) containing the address of a next PRD in the linked list.

In an embodiment, each of the PRDs (350A-350N) is designed to include a starting address for a block of memory in memory unit 130, as well as a size (number of memory locations) of the block, with the block being the locations in a memory, where a corresponding subset of a sequence of bytes to be read, are to be stored. Each of such blocks may be allocated by an operating system executing in the system of FIG. 1 before a device driver sends the read request to storage controller 120.

CPU 110 may, in addition, set a flag in (not shown) contained in control unit 220, indicating that a request has been made. In response, control unit 220 reads the contents of field 310, and retrieves a corresponding command header (field 320) in main memory 130. In an embodiment supporting NCQ technology, up to 32 command headers may be present (not shown) corresponding to each one of 32 pending commands possible. The command header 320, in turn, contains an address of a command table 330. Command table 330, in turn, contains the address of a PRD table (PRD table 350 in this example).

Thus, all the PRDs together specify a target memory and memory locations to store the data elements sought to be retrieved from the secondary storage units. It should be appreciated that the timely availability of the location descriptors may be important to minimize the time duration the data elements are buffered within the storage controller, and thereby reduce the buffer space requirements.

In one embodiment, a control unit may retrieve all the location descriptors of all pending read requests. However such an approach may require substantial amount of buffer space. The buffer space requirements are compounded in case of technologies such as NCQ, noted above.

An aspect of the present invention ensures timely availability of location descriptors, while reducing required buffer size, as described below in further detail.

5. Retrieving Location Descriptors

FIG. 4 is a flowchart illustrating the manner in which location descriptors are retrieved and used according to an aspect of the present invention. The flowchart is described with respect to FIG. 1, and in relation to storage controller 120, merely for illustration. However, various features can be implemented in other environments (e.g., with or without the shared buffer described above with respect to FIG. 3) and other components.

Furthermore, the steps are described in a specific sequence merely for illustration. Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 401, in which control passes to step 410.

In step 410, storage controller 120 receives a request to transfer a desired sequence of data elements from a storage device to a main memory, with the request specifying where location descriptors are located. As noted above, location descriptors identify where (specific memory unit(s) and locations therein) the data is to be stored. To illustrate with an example, storage controller 120 may receive a request to transfer a file stored in secondary storage unit 140A to main memory 130.

Any pre-specified convention can be used for the format of the request (including to identify the specific secondary storage unit, the location/identifiers of sequence of data elements thereon) as well as for specifying the location of the location descriptors. Several approaches for such conventions will be apparent to one skilled in the relevant arts by reading the disclosure provided herein. However, in one embodiment, the data elements sought to be retrieved are specified according to AHCI standard noted above and the location descriptors are specified as described above with respect to FIGS. 3A and 3B. Control then passes to step 420.

In step 420, storage controller 120 issues commands to the storage device to provide (i.e., send back) the sequence of data elements. In the example noted above, storage controller 120 issues commands to secondary storage unit 140A to provide data at specific locations, for example, according to SATA protocol well known in the relevant arts. The commands may be issued consistent with a corresponding protocols/standards. Control then passes to step 440.

In step 440, storage controller 120 retrieves a subset of the descriptors before completion of reception of data elements to be stored using a first one of the descriptors in the subset. In case of serial technologies noted above, only a single location descriptor may be needed assuming it takes a lot more time to retrieve data elements corresponding to a location descriptor. More location descriptors can be retrieved, but retrieving all the location descriptors (for the request) may be undesirable for reasons noted above.

Actions to retrieve the subset of descriptors can precede issuance of the commands of step 420. However, to reduce buffer requirements, the actions to retrieve the location descriptors may commence after issuing the commands of step 420, but before completion of reception of data corresponding to a first descriptor in the subset. The specific actions depend on the unit from which the descriptors are to be retrieved.

For example, assuming a specific location descriptor indicates that byte numbers 1024-2047 are to be stored in memory locations 4048 to 5071 of main memory 130, storage controller 120 may ensure that location descriptor is available to control unit 220 at least before byte 5071 (last byte) is received from secondary storage unit. Additional location descriptors may reduce the number of times bus 112 needs to be accessed for the purpose of retrieving location descriptors from main memory 130. Control then passes to step 445.

In step 445, storage controller 120 stores the retrieved descriptors in a buffer (e.g., 210). As only a subset of location descriptors are retrieved in step 440, the buffer size requirements may be reduced. Control then passes to step 450.

In step 450, storage controller 120 stores the received data at memory locations indicated by the first one of the descriptors. Control then passes to step 460.

In step 460, storage controller 120 fetches a next descriptor following the subset and adds the next descriptor to the subset. To illustrate, assuming the subset of descriptors retrieved in step 440 contains two descriptors, storage controller 120 retrieves the third descriptor upon reception of data (and subsequent storage at a corresponding location in main memory in step 450) corresponding to the first descriptor, and thus has the location information to store data corresponding to the second and third descriptors. Control then passes to step 480.

In step 480, if storage controller 120 determines that more data from the file is being received, control passes to step 450, else control passes to step 499, in which the flowchart ends.

Due to the retrieval of only a subset of the location descriptors, the buffer size requirements may be reduced. In addition, due to the ready availability of the required location description, the amount of time data (received from secondary storage units) needs to be buffered may also be reduced, thereby reducing the buffer size requirements.

Buffer 210 can be implemented using various approaches while supporting the desired features described above. The description is provided with respect to the details of a buffer 210 in one embodiment.

6. Buffer

Figure 5A:
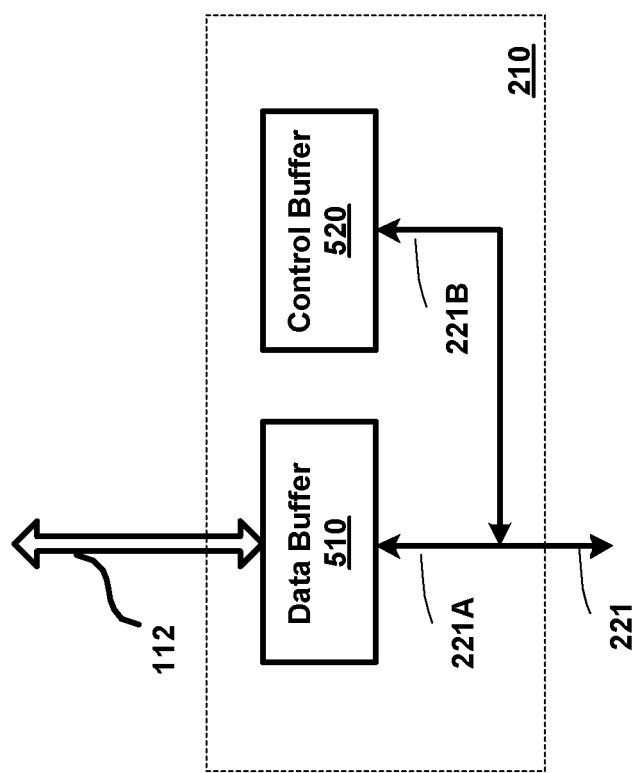
FIG. 5A is a diagram illustrating the details of a buffer in a storage controller in an embodiment.
Figure 5B:
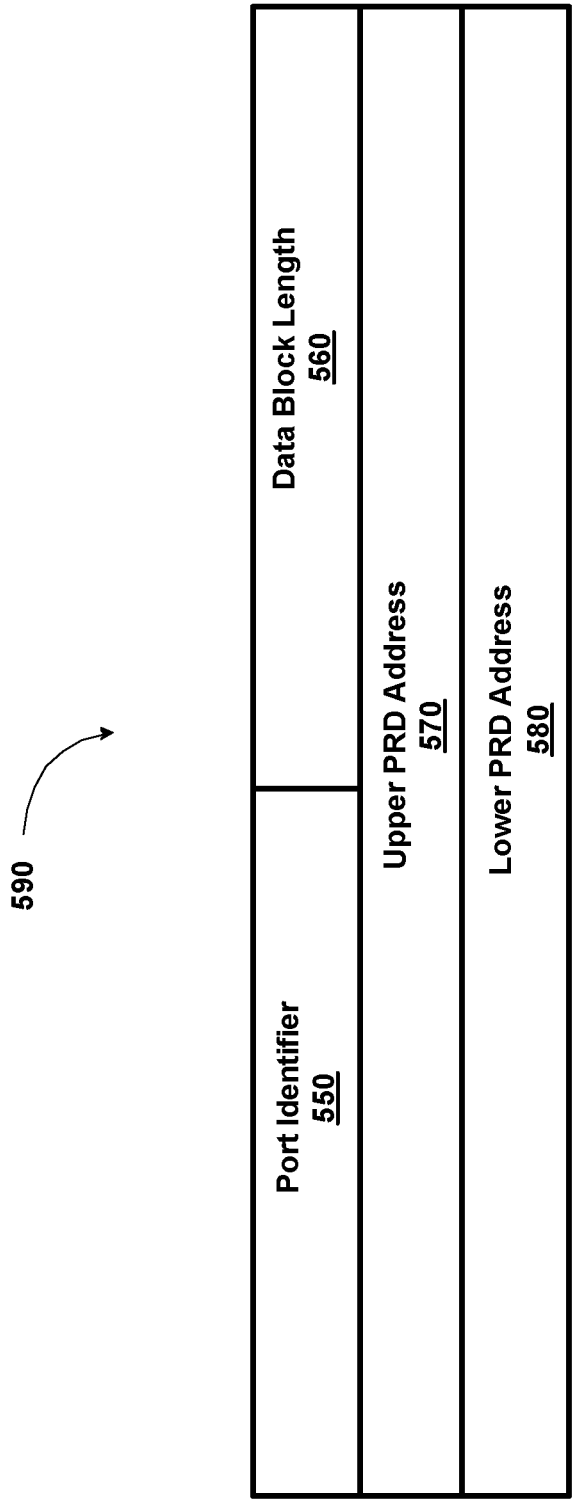
FIG. 5B is a diagram illustrating the manner in which control information for data in a buffer in a storage controller is specified in an embodiment.

FIG. 5A is a block diagram illustrating the details of buffer 210 in one embodiment. Buffer 210 is shown containing data buffer 510 and control buffer 520, which are described in further detail below with reference to FIG. 5B as well. FIG. 5B illustrates the nature of data stored in control buffer 520 in one embodiment.

Control unit 220 stores data blocks (subset of the sequence of data elements sought to be retrieved by a single read request from CPU 110) corresponding to each location descriptor in data buffer 510, and stores status information for the block in control buffer 520. FIG. 5B illustrates the various fields that contain status information for a corresponding block of data in an embodiment of the present invention.

In a typical scenario, several file requests may be outstanding (yet to be completed or pending), and control unit 220 may store file portions received from each of the secondary storage units 140A-140N in data buffer 510. Since a single buffer 210 is used to store data corresponding to different links (data received from different secondary storage units), and with different target addresses in main memory, each block of data may need to be stored with corresponding status information, as described below with an example.

Status entry 590 is shown containing fields 550, 560, 570 and 580. In the example, it is assumed that status entry 590 corresponds to data received from secondary storage unit 140A, and to be written to main memory location 360, i.e., data corresponding to PRD 350A, shown in FIG. 3A.

Field 550 specifies the port (link corresponding to a secondary storage unit) from which the data was received. In the example, the entry would correspond to a number specifying that the data was received from secondary storage unit 140A.

Field 560 specifies the length/size of the block of data (in data buffer 510) to which status entry 590 corresponds.

Fields 570 and 580 together specify the address in main memory 130 starting from which the block of data in data buffer 510 is to be written. The address in main memory 130 is specified by the contents of a PRD whose address in turn is specified by field 570 (Upper PRD address (e.g., higher order 32 bits)), and field 580 (Lower PRD address (e.g., lower order 32 bits). The upper and lower PRD addresses shown in two fields 570 and 580 reflect that the address space in main memory is specified by a 64-bit address and each of the fields only contains 32 bits in one embodiment. The values for fields 570 and 580 are retrieved from PRD 350A in the illustrative example.

Thus, the pertinent information of location descriptors may be stored associated with each block (boundaries in the sequence of data corresponding to the data specified by each location descriptor) of data in buffer 210 and bus master 250 may use the information to determine the target locations/memory to store each data element.

The description is continued with an illustration of an example sequence diagram illustrating the sequence of operations involved in the read operation of a sequence of data elements in an embodiment.

7. Sequence Diagram

Figure 6:
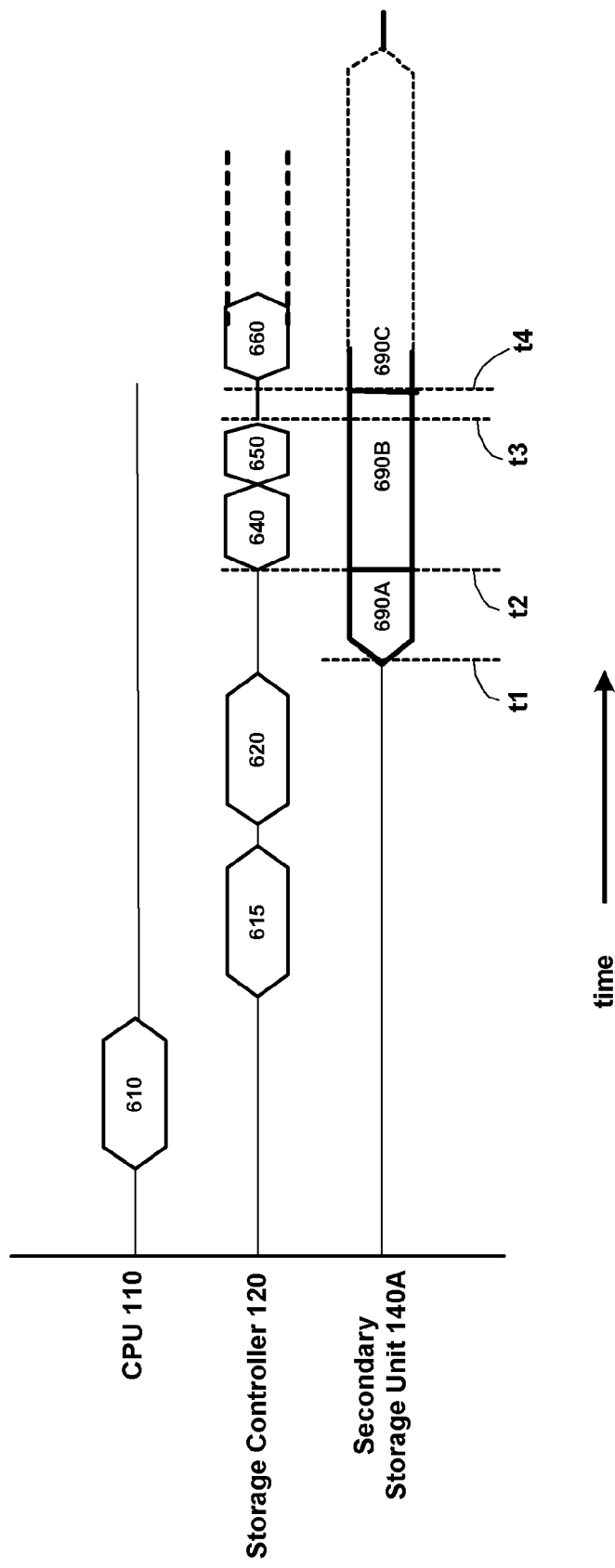
FIG. 6 is a sequence diagram used to illustrate the sequence of events during transfer of data from a secondary storage to a target memory in one embodiment.

FIG. 6 is an example sequence diagram used to illustrate the sequence of operations in each of CPU 110, storage controller 120 and secondary storage unit 140A involved during a file read operation in an embodiment of the present invention.

Event 610 represents a request by CPU 110 to storage controller 120 to transfer a sequence of data elements (corresponding to a file) from secondary storage unit 140A to main memory 130. Event 615 represents an operation in which storage controller 120 reads the request 610 issued by CPU 110.

Event 620 represents a command issued by storage controller 120 to secondary storage unit 140A to provide the data in the file. In the same event, storage controller 120 may initiate retrieval of the subset of location descriptors (by appropriate access commands issued to main memory 130), as described above.

In the example, it is assumed that storage controller 120 retrieves two location descriptors during event 620, even though a single location descriptor may be sufficient to ensure timely availability of the corresponding information in most instances (assuming retrieval of the data block from secondary storage unit takes more time than retrieving the location descriptor from the main memory). However, in case of small (especially the last block) blocks, retrieving that extra location descriptor ensures timely availability of the necessary information without having to wait for location descriptors.

At time instance t1, secondary storage unit 140A starts providing the data in the file to storage controller 120. The data may be stored in buffer 210 (FIG. 2). By t2, the data specified by the first location descriptor is deemed to be available in buffer 210. The file descriptor is deemed to have been retrieved/received ahead of t2 and also stored in buffer 210 (by control unit 220). All the remaining ones of the set of file descriptors (two, noted in event 620 above) are also deemed to be received.

Accordingly, event 640 represents transfer of the data 690A from data buffer 510 to main memory 130. Thus, bus master 250 may initiate DMA transfer of the corresponding portions to main memory 130 as soon as the portions (or at least a minimum portion allowed to be transferred in a DMA transfer) are available. In an embodiment, a DMA transfer transfers a minimum of 64 bytes. Thus, when at least 64 bytes of a corresponding portion of a file have been received and stored in buffer 210, bus master 250 may initiate the transfer to main memory 130.

Reception of data continues, as represented by the commencement of reception of data 690B corresponding to the second location descriptor.

At time instance t3, storage controller 120 may retrieve a next descriptor (third location descriptor in the example) before the data corresponding to the second descriptor is completely received at time instance t4. Event 660, shown commencing shortly after t4, represents transfer of the data 690B to main memory 130. Starting at time instance t4, reception of data 690C corresponding to the third descriptor (retrieved at time instance t3) commences.

Retrievals of subsequent location descriptors, writing of data portions to main memory 130, and reception of data from secondary storage unit 140A continues in a similar fashion, till all the data elements requested in a read request are transferred to main memory 130.

While the description above is provided with respect to a single read request merely for illustration, it should be appreciated that multiple read requests would be processed in parallel consistent with the description above.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A storage controller controlling access requests to a plurality of secondary storage units, said storage controller comprising:
a buffer;
a control unit coupled to said buffer; and
a plurality of FIFOs (first in first out) coupled between said control unit and said secondary storage units, wherein there is a one-to-one correspondence between said secondary storage units and said FIFOs, said control unit comprising a data path between said buffer and said FIFOs, and said buffer comprising a data path between said control unit and a main memory;
wherein said control unit is operable to receive: i) a first read request specifying a first sequence of data to be read from a first secondary storage unit and transferred to said main memory and ii) a second read request specifying a second sequence of data to be read from a second secondary storage unit and transferred to said main memory, said control unit operable to retrieve said first sequence of data from said first secondary storage unit in response to said first read request and to store said first sequence of data in a first FIFO corresponding to said first secondary storage unit before said first sequence of data is transferred to said buffer, said control unit further operable to retrieve said second sequence of data from said second secondary storage unit in response to said second read request and to store said second sequence of data in a second FIFO corresponding to said second secondary storage unit before said second sequence of data is transferred to said buffer, said buffer concurrently storing both of said first sequence of data and said second sequence of data before said first sequence and said second sequence are each transferred from said buffer to said main memory, said buffer also storing location descriptors that identify where in said main memory said first sequence of data and said second sequence of data are to be stored.

2. The storage controller of claim 1, further comprising a master unit which transfers said first sequence of data and said second sequence of data to said main memory.

3. The storage controller of claim 2, wherein said buffer comprises a control buffer and a data buffer, wherein said control unit stores said first sequence of data and said second sequence of data in said data buffer, said control unit further storing said location descriptors in said control buffer.

4. The storage controller of claim 3, wherein said first read request further specifies a first location descriptor that indicates said main memory and locations in which a first subset of said first sequence of data are to be stored in said main memory, wherein said control unit pre-fetches said first location descriptor before completion of retrieval of said first subset.

5. The storage controller of claim 4, wherein said control unit pre-fetches a second location descriptor while said first subset is being received from said first secondary storage unit, wherein said second location identifier identifies a second subset of data, said second subset of data following said first subset according to said sequence order.

6. The storage controller of claim 2, wherein said master unit comprises a DMA (direct memory access) engine which stores said first sequence of data and said second sequence of data to said main memory.

7. The storage controller of claim 1, wherein said buffer comprises a memory location, wherein said control unit stores a part of said first sequence of data in said memory location, said buffer storing a part of a third sequence of data retrieved from said second storage unit in response to a third read request.

8. The storage controller of claim 1, wherein said buffer is implemented as a single memory unit, wherein said single memory unit contains a single address space and a single access circuit.

9. The storage controller of claim 1, wherein said buffer also stores status information corresponding to said first sequence and said second sequence, said status information comprising an entry identifying a port from which said first sequence was retrieved and an entry identifying a port from which said second sequence was retrieved.

10. A system comprising:
a memory;
a plurality of secondary storage units coupled to said memory and comprising a first secondary storage unit and a second secondary storage unit;
a processing unit coupled to said secondary storage units and operable for issuing: i) a first read request specifying a first sequence of data to be read from said first secondary storage unit and transferred to said memory and ii) a second read request specifying a second sequence of data to be read from said second secondary storage unit; and
a storage controller coupled to said secondary storage units and operable for processing said first read request and said second read request, said storage controller comprising:
a buffer;
a control unit coupled to said buffer; and
a plurality of FIFOs (first in first out) coupled to said control unit between said control unit and said secondary storage units, said control unit comprising a data path between said buffer and said FIFOs, and said buffer comprising a data path between said control unit and said memory, wherein said plurality of FIFOs comprises a FIFO per secondary storage unit and wherein said control unit is between said FIFOs and said buffer; wherein said control unit is operable to receive said first read request and said second read request, said control unit further operable to retrieve said first sequence of data from said first secondary storage unit in response to said first read request and to store said first sequence of data in a first FIFO corresponding to said first secondary storage unit before said first sequence of data is transferred to said buffer, said control unit further operable to retrieve said second sequence of data from said second secondary storage unit in response to said second read request and to store said second sequence of data in a second FIFO corresponding to said second secondary storage unit before said second sequence of data is transferred to said buffer, said buffer concurrently storing both of said first sequence of data and said second sequence of data before said first sequence and said second sequence are each transferred from said buffer to said memory, said buffer also storing location descriptors that identify where in said memory said first sequence of data and said second sequence of data are to be stored.

11. The system of claim 10, further comprising a master unit which transfers said first sequence of data and said second sequence of data to a main memory.

12. The system of claim 11, wherein said buffer comprises a control buffer and a data buffer, wherein said control unit stores said first sequence of data and said second sequence of data in said data buffer, said control unit further storing said location descriptors in said control buffer.

13. The system of claim 12, wherein said first read request further specifies a first location descriptor that indicates said memory and locations in which a first subset of said first sequence of data is to be stored in said memory, wherein said control unit pre-fetches said first location descriptor before completion of retrieval of said first subset.

14. The system of claim 13, wherein said control unit pre-fetches a second location descriptor while said first subset is being received from said first secondary storage unit, wherein said second location identifier identifies a second subset of data, said second subset of data following said first subset according to said sequence order.

15. The system of claim 10, wherein said buffer comprises a memory location, wherein said control unit stores a part of said first sequence of data in said memory location, said buffer storing a part of a third sequence of data retrieved from said second storage unit in response to a third read request.

16. The system of claim 15, wherein said buffer is implemented as a single memory unit, wherein said single memory unit contains a single address space and a single access circuit.

17. A method of processing read requests in a storage controller, said method comprising:
receiving a first read request to transfer a first sequence of data elements from a first secondary storage unit to a target memory;
receiving a second read request to transfer a second sequence of data elements from a second secondary storage unit to said target memory;
issuing a command to said first and second secondary storage units to provide said first and second sequences of data elements, respectively;
retrieving said first sequence of data from said first secondary storage unit in response to said first read request and storing said first sequence of data in a first FIFO (first in first out) corresponding to said first secondary storage unit before said first sequence of data is transferred to a buffer;
retrieving said second sequence of data from said second secondary storage unit in response to said second read request and storing said second sequence of data in a second FIFO corresponding to said second secondary storage unit before said second sequence of data is transferred to said buffer;
transferring said first sequence of data and said second sequence of data from said first FIFO and from said second FIFO, respectively, to said buffer via a control unit comprising a data path between said buffer and said first and second FIFOs;
storing both said first sequence of data and said second sequence of data concurrently in said buffer before said first and second sequences are transferred to said target memory;
retrieving a set of location descriptors, with a first location descriptor contained in said set of location descriptors identifying locations in said target memory at which said first sequence of data elements are to be stored;
storing said set of location descriptors in said buffer concurrently with said first sequence of data and said second sequence of data;
storing said first sequence of data elements in locations of said target memory indicated by said first location descriptor, wherein said set of location descriptors is a subset of a plurality of descriptors which together identify locations in said target memory to store data elements, and wherein said retrieving retrieves said first location descriptor before completion of reception of said first sequence of data elements; and transferring said first sequence of data and said second sequence of data from said buffer to said target memory, said buffer comprising a data path between said control unit and said target memory.

18. The method of claim 17, wherein said retrieving retrieves a next descriptor and adds said next descriptor to said set of descriptors after completion of said storing.

19. The method of claim 18, wherein said set of descriptors equals two descriptors.

20. The method of claim 18, wherein said set of descriptors equals one descriptor.

21. The method of claim 18, further comprising:
computing a time duration, wherein said retrieving initiates a command to retrieve said next descriptor after said time duration expires.

22. The method of claim 17, wherein said retrieving initiates retrieval of another set of location descriptors by sending a corresponding retrieval request after storing said set of location descriptors in said buffer, wherein said another set follows said set of location descriptors in an order of said plurality of location descriptors.

* * * * *